(12) United States Patent
Spaulding et al.

(10) Patent No.: US 11,068,845 B2
(45) Date of Patent: Jul. 20, 2021

(54) CROWD-SOURCED INCIDENT MANAGEMENT

(71) Applicant: Oracle International Corporation, Redwood Shores, CA (US)

(72) Inventors: Kent Arthur Spaulding, Portland, OR (US); Kenneth Joseph Meltsner, Portland, CA (US); Reza M. B'Far, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 15/717,666

(22) Filed: Sep. 27, 2017

(65) Prior Publication Data

US 2019/0095863 A1 Mar. 28, 2019

(51) Int. Cl.
*G06Q 10/10* (2012.01)

(52) U.S. Cl.
CPC .......... *G06Q 10/10* (2013.01); *G06Q 10/105* (2013.01)

(58) Field of Classification Search
CPC .......... G06Q 30/0185; G06Q 30/0282; G06Q 10/00; G06Q 50/01; G06Q 50/265; G06F 16/152; G06F 21/6245
See application file for complete search history.

(56) References Cited

U.S. PATENT DOCUMENTS

| | | | |
|---|---|---|---|
| 8,250,025 B2 | 8/2012 | Ferraro et al. | |
| 8,515,565 B2 | 8/2013 | Smith et al. | |
| 9,087,215 B2 | 7/2015 | LaFever et al. | |
| 9,313,177 B2 | 4/2016 | Blumenfeld et al. | |
| 9,595,184 B2 | 3/2017 | Almansour | |
| 9,916,755 B1* | 3/2018 | Ratti | G08G 1/0175 |
| 2003/0216962 A1* | 11/2003 | Heller | A63F 13/12 705/318 |
| 2005/0044059 A1* | 2/2005 | Samar | G06F 21/6245 |
| 2007/0112713 A1 | 5/2007 | Seaman et al. | |
| 2013/0212693 A1 | 8/2013 | Etchegoyen | |

(Continued)

OTHER PUBLICATIONS

Chatzigeorgiou, C. et al (Jun. 2017). A communication gateway architecture for ensuring privacy and confidentiality in incident reporting. In 2017 IEEE 15th International Conference on Software Engineering Research, Management and Applications(SERA) (pp. 407-411). IEEE (Year: 2017).*

(Continued)

*Primary Examiner* — Gabrielle A McCormick
*Assistant Examiner* — Maame Ofori-Awuah
(74) *Attorney, Agent, or Firm* — Invoke

(57) ABSTRACT

Techniques for managing complaints are disclosed. The system may receive complaints submitted by users. A complaint may describe an incident, such as a safety issue or a cheating incident. The system analyzes a set of complaints to identify similar complaints. Upon identifying a threshold number of similar complaints, the system generates an incident report based on the complaints. The system may refrain from generating or submitting any incident report for a complaint if the threshold number of similar complaints have not been received by the system. The system may or may not include information such as the identity of the reporter, the identity of the accused party, or the incident location in an incident report based on threshold criteria.

28 Claims, 4 Drawing Sheets

(56) References Cited

U.S. PATENT DOCUMENTS

2014/0040154 A1\* 2/2014 Webb .................... G06Q 90/00
705/325
2015/0234837 A1 8/2015 Rowe et al.
2015/0317325 A1\* 11/2015 Key ..................... G06F 16/152
707/770
2015/0324396 A1\* 11/2015 Sheik Adam ....... H04L 63/0407
707/792

OTHER PUBLICATIONS

"What is MySafeWorkplace." MySafeWorkplace. https://www.mysafeworkplace.com/StaticContent.aspx?staticPage=WhatIs&headerImage=WhatIs. Apr. 17, 2017. pp. 1-2.
"Anonymous Reporting: Integrated, Secure & Confidential Reporting." iViewsystems. http://www.iviewsystems.com/anonymous-reporting. Apr. 17, 2017. pp. 1-6.
Paul Conlon et al. "Using an Anonymous Web-Based Incident Reporting Tool to Embed the Principles of a High-Reliability Organization." Advances in Patient Safety, vol. 1. Aug. 2008. pp. 1-13. Available at https://www.ahrq.gov/downloads/pub/advances2/vol1/Advances-Conlon_50.pdf.

\* cited by examiner

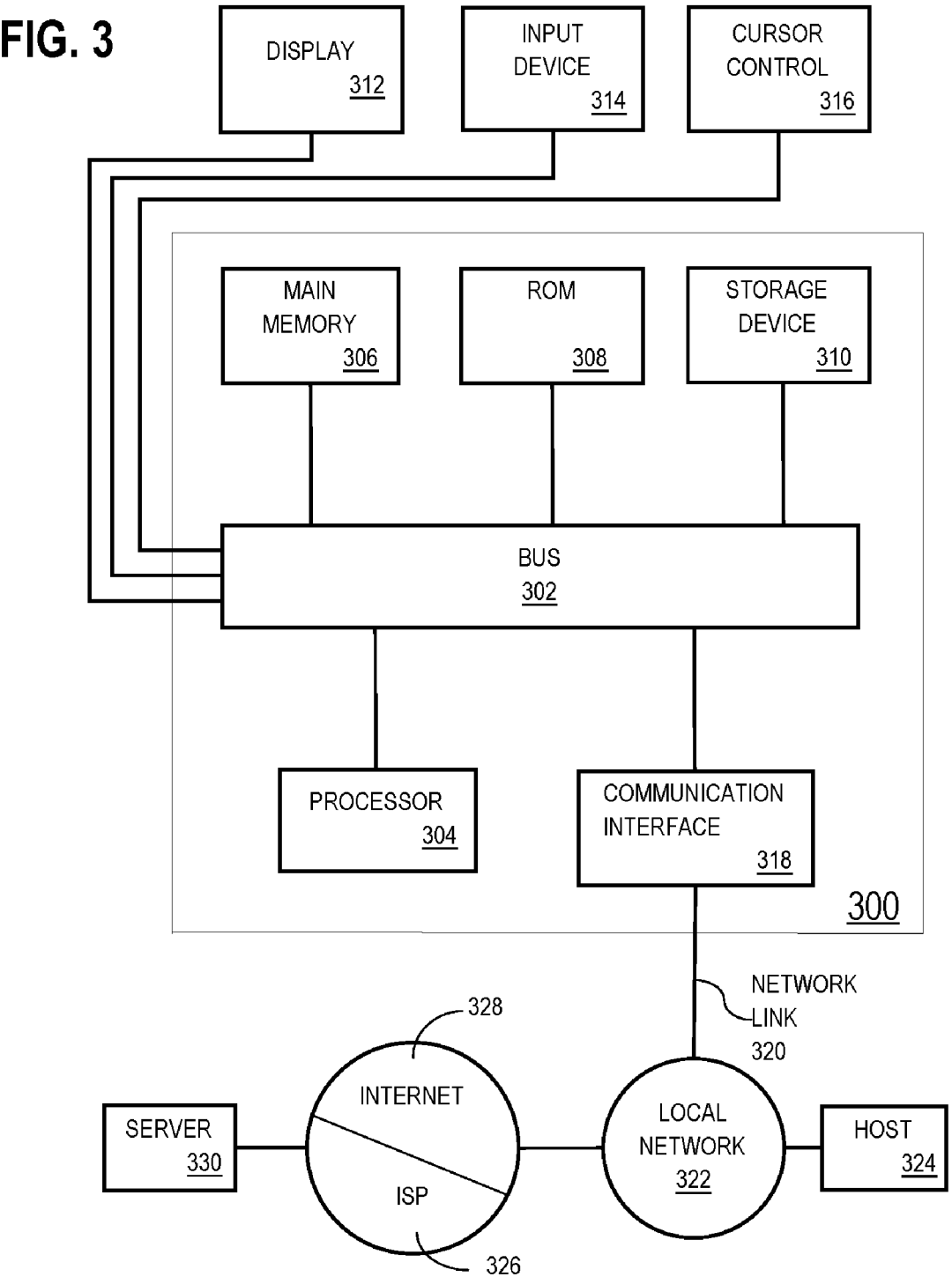

CROWD-SOURCED INCIDENT MANAGEMENT

TECHNICAL FIELD

The present disclosure relates to incident management. In particular, the present disclosure relates to determining whether to generate and submit an incident report, based on a set of received complaints.

BACKGROUND

A complaint is a statement that a situation is or was unsatisfactory, unacceptable, or otherwise not up to normal standards. A complaint may describe an incident that has occurred. As an example, a complaint may describe a crime, such as harassment, mugging, or assault. As another example, a complaint may describe unsafe facilities, such as cracked sidewalks or a loose handrail. As another example, a complaint may describe an ethical issue, such as a teacher selling grades or a student cheating on a test. A system may generate an incident report that documents a written or verbal complaint. The incident report may be identical to a complaint or may include additional or different content related to a complaint.

Incident reporting and management software is often used for managing complaints and incident reports. Incident reporting and management software may allow, for example, college campuses to improve the safety of students and staff. In particular, the software may track incident reports and identify reoccurring problems. Incident reporting and management is a core practice in a wide range of vertical applications including hospitals, transportation, financial institutions, information technology infrastructure management, and government services.

Commonly, complaints include sensitive information that may need to be kept confidential or anonymous. As an example, the name of a person reporting a crime is often kept confidential for the person's safety. Information may be kept confidential by using third-party reporting services or an independent ombudsman's office. A third-party reporting service may serve as intermediary between a reporting entity and an incident management system. The third-party reporting service may disclose aspects of a complaint without identifying the reporting entity.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates a block diagram of a system in accordance with one or more embodiments.

DETAILED DESCRIPTION

Figure 1:
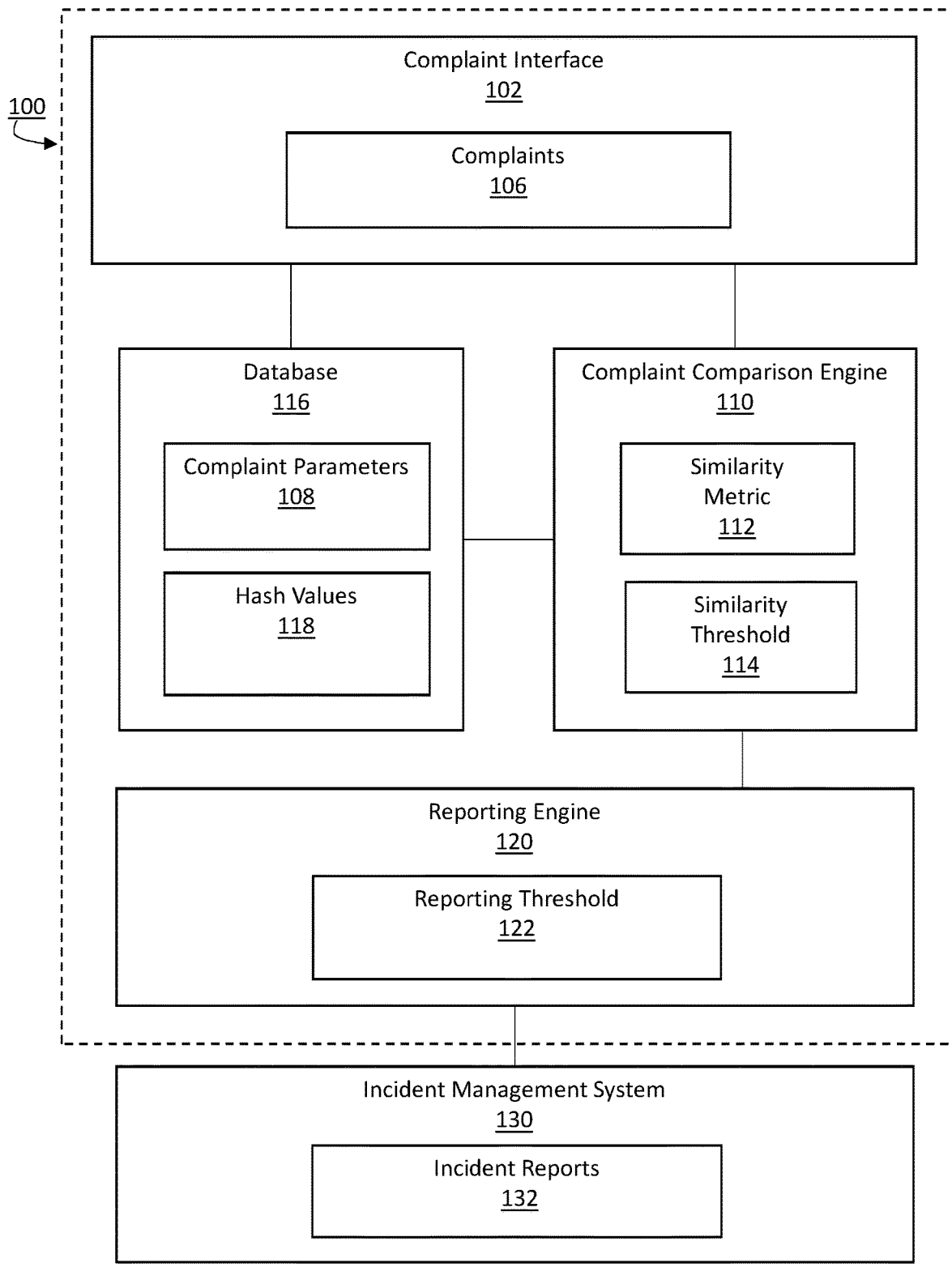
FIG. 1 illustrates a complaint management system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. COMPLAINT MANAGEMENT SYSTEM
3. SELECTIVE SUBMISSION OF AN INCIDENT REPORT
   A. CONTACTING REPORTING ENTITIES
   B. PROGRESSIVE DISCLOSURE
3. REPORTING BY QUORUM
4. AGGREGATION BY ORGANIZATION OR LOCATION
5. MISCELLANEOUS; EXTENSIONS
6. HARDWARE OVERVIEW

1. General Overview

A user may submit a complaint to a Complaint Management System (CMS). A complaint may describe an incident. As an example, the CMS may receive a complaint submitted by a student. The complaint may describe an incident in which the student was bullied by another student. The CMS may generate an incident report, corresponding to the complaint, for submission to an Incident Management System (IMS). An incident report may include (a) content that is identical to content in the complaint, (b) information derived from or based on the content in the complaint, or (c) aggregated information based on content included in a set of complaints.

One or more embodiments relate to selectively submitting an incident report corresponding to a complaint. The CMS determines whether to generate and submit the incident report to the IMS. The CMS may generate an incident report for submission to the IMS if a threshold number of similar complaints are received by the CMS. The CMS may refrain from generating or submitting any incident report for a complaint if the threshold number of similar complaints have not been received by the CMS. The CMS may determine, based on threshold criteria, whether or not to include information associated with a complaint in an incident report. For example, the CMS may or may not include (a) an identity of the reporter, (b) an identity of a subject of the complaint (referred to herein as an "accused entity"), or (c) a location associated with the complaint in an incident report.

One or more embodiments include determining whether or not a complaint is similar to another complaint based on a comparison of the complaints. Comparing complaints may include comparison of any values included in the complaints, or values (for example, synonyms) derived from values included in the complaints. Comparing complaints may include a comparison of hash values derived from the complaints. The complaint management system executes a set of one or more comparison operations to compute a similarity score for a set of complaints. If the similarity score for the set of complaints exceeds a threshold value, then the set of complaints are determined to be similar. If the similarity score for the set of complaints does not exceed the threshold value, then the set of complaints are determined to be different, i.e., not similar.

One or more embodiments include comparing identifiers (for example, hash values) which represent complaint parameters including but not limited to the reporting party, the perpetrator, or the issue. As an example, a set of complaints associated with an accused entity are reported in an incident report if the set of complaints have been received by the CMS from three or more unique reporting entities. Identifiers corresponding to the reporting entities for the set of complaints are analyzed to determine if at least three unique identifiers are included in the identifiers corresponding to the reporting entities. If at least three unique identifiers are included in the identifiers corresponding to the reporting entities, then the incident report is submitted with complete identification information for the reporting entities. If at least three unique identifiers are not included in the identifiers corresponding to the reporting entities, then the incident report is not submitted to the IMS. Alternatively, if at least three unique identifiers are not included in the identifiers corresponding to the reporting entities, an incident report is submitted to the IMS without complete identification information for the reporting entities.

One or more embodiments described in this Specification and/or recited in the claims may not be included in this General Overview section.

2. Complaint Management System

FIG. 1 illustrates a Complaint Management System (CMS) 100 in accordance with one or more embodiments. The CMS 100 is a system for selectively generating and submitting incident reports to an Incident Management System (IMS) 130. As illustrated in FIG. 1, the CMS 100 includes a complaint interface 102, a complaint comparison engine 110, a database 116, and a reporting engine 120. In one or more embodiments, the CMS 100 may include more components or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, a complaint 106 is a statement that a situation is or was unsatisfactory, unacceptable, or otherwise not up to normal standards. A complaint may describe an incident that occurred. Complaints may describe, for example, an act of harassment, and a safety issue. A complaint 106 may describe an incident in general or specific terms. As an example, an employee may submit a complaint describing, in detail, an incident in which a coworker harassed the employee.

In an embodiment, a complaint interface 102 is a user interface (UI), such as a graphical user interface (GUI). The complaint interface may present components for receiving a complaint via user input. The complaint interface 102 may include components such as text boxes, radio buttons, and drop-down menus. The complaint interface 102 may accept user-specified and/or user-selected elements for defining a complaint 106.

In an embodiment, a complaint 106 includes complaint parameters 108. Complaint parameters 108 may include details about the complaint. As an example, a complaint parameter may refer to a date of an incident. As another example, a complaint parameter may refer to the name of the party submitting the complaint. The party submitting the complaint is referred to herein as the "reporting entity" or the "reporter." As another example, a complaint parameter may refer to the name of any person involved in the incident. Persons involved in an incident may include witnesses and one or more persons accused of wrongdoing. The person(s) or organization(s) accused of wrongdoing are referred to herein as the "accused entity" or "accused." As another example, a complaint parameter 108 may include an act associated with the incident, such as alteration of grades or theft. A complaint parameter may be a complaint type. A complaint type may describe a complaint in broad or specific terms. Examples of complaint types include ethics issue or safety issue. Additional examples of complaint parameters 108 include a company division associated with the incident and an affiliation of the accused entity.

In an embodiment, a hash value 118 (also referred to as a hash) is a value which is derived from data to uniquely identify the data. Data is mapped to a hash value 118 via a hash function. A hash value 118 may be a fixed-length numeric value. The hash function, when applied to two identical texts, will produce the same hash value. A hash function is a secure one-way function which allows for derivation of the hash value from the original text. However, the hash value cannot be used to determine the original text without significant computational effort, even when the range of possible texts is limited.

Hash calculation may include a variety of algorithms, including algorithms which use random data or multiple hashes of selected portions of text. The longer the hash value, the greater the difficulty required to determine the original text. Further, the longer the hash value, the lower the likelihood of two different texts mapping to the same hash value (collision). Hash values 118 may include a field containing a random value. Inclusion of a field containing a random value increases the effort required to find text corresponding to the calculated hash value. The same random value would be used in comparing hashes to determine similarity.

A hash value 118 may be assigned to one or more complaint parameters 108. As an example, three records, corresponding to three respective complaints, have been stored. In the records, the name of an accused party, John Smith, has been replaced with the hash value 59 4 248 182 77 98 642 201. The system can identify records containing the hash value 59 4 248 182 77 98 642 201, to determine that three complaints include the same accused party. Using hash values, the system can identify duplicate records without revealing the data corresponding to the records.

In an embodiment, the database 116 is any type of storage unit and/or device (e.g., a file system, collection of tables, or any other storage mechanism) for storing data. Further, database 116 may include multiple different storage units and/or devices. The multiple different storage units and/or devices may or may not be of the same type or located at the same physical site. Further, database 116 may be implemented or may execute on the same computing system as the complaint interface 102, the complaint comparison engine 110, the reporting engine 120, and the incident management system 130. Alternatively, or additionally, database 116 may be implemented or executed on a computing system separate from the complaint interface 102, the complaint comparison engine 110, the reporting engine 120, and the incident management system 130. The database 116 may be communicatively coupled to the complaint interface 102, the complaint comparison engine 110, the reporting engine 120, and the incident management system 130 via a direct connection or via a network.

The database may store complaint parameters 108 and/or hash values 118. Information describing complaint parameters 108 and/or hash values 118 may be implemented across any of components within the CMS 100. However, this information is illustrated within the database 116 for purposes of clarity and explanation.

In one or more embodiments, the complaint comparison engine 110 includes hardware and/or software components for identifying similar complaints. The complaint comparison engine may identify values, such as keywords, in a complaint for comparison to other complaints. The complaint comparison engine may compare values derived from values in complaints. As an example, the complaint comparison engine may compare hash values 118 derived from values in complaints. The complaint comparison engine may compare complaints using a similarity metric 112.

In an embodiment, the similarity metric 112 is a factor, or combination of factors, for determining a similarity between two or more complaints. The similarity metric may be the presence of a same complaint parameter in a set of complaints. As an example, the similarity metric is whether two complaints both contain the word "cheating." Alternatively, or additionally, the similarity metric may be an algorithm for use in generating a similarity score for a set of complaints. For example, the similarity metric is $$S=\delta(a)+\delta(t)+\delta(y)$$

where $\delta(a)=1$ if two complaints include the same accused entity, otherwise, $\delta(a)=0$. $\delta(t)=1$ if two complaints are of a same complaint type, otherwise, $\delta(t)=0$. $\delta(y)=1$ if two complaints relate to incidents occurring in a same calendar year, otherwise $\delta(y)=0$. S, the similarity score, may be a value between 0 and 3. The similarity metric 112 may be based on the complaint parameters 108. Alternatively, or additionally, the similarity metric 112 may be based on the hash values 118.

In an embodiment, the similarity threshold 114 is a value indicative of whether two or more complaints are similar or different. The similarity threshold 114 may be a value corresponding to a similarity score. As an example, for a given similarity metric, the similarity score can be a number between 0 and 3. The similarity threshold is 2. If the similarity score exceeds the similarity threshold, then the set of complaints are considered similar. Alternatively, or additionally, the similarity threshold 114 may be a qualitative value. For example, the similarity threshold is: same date and same location. If two complaints have the same date and the same location, then the two complaints are similar. The similarity threshold 114 may be determined based on policy. Accordingly, the similarity threshold 114 may vary across organizations and/or departments.

In an embodiment, the reporting threshold 122 (also referred to herein as an "incident reporting threshold") is a threshold number of similar complaints. The reporting threshold 122 may be used to select complaints for reporting and/or escalation. The reporting threshold 122 may be defined according to the policy of an organization or department. The reporting threshold 122 may increase as the severity of the complaint decreases. As an example, the receipt of two complaints of sexual harassment may indicate that immediate action is required. On the other hand, for complaints related to an employee wearing too much perfume, action may not be appropriate until ten or more complaints are received.

In an embodiment, an incident report 132 is a report based on one or more complaints. An incident report 132 may include content that is identical to content in a complaint. Alternatively, an incident report 132 may include information derived from or based on the content in a complaint. An incident report may include text which summarizes or paraphrases text in one or more complaints.

An incident report 132 may include information determined based on a set of complaints. As an example, the system analyzes fifteen complaints including detailed accounts of how and when a bank manager, Tom Thompson, encouraged employees to commit fraud. Based on the complaints, the system generates an incident report 132 that states that Tom Thompson was accused of 15 instances of encouraging employees to commit fraud. The incident report includes a subset of the data included in the original complaints: the dates and the names of the reporting parties.

In an embodiment, the reporting engine 120 includes hardware and/or software components for determining whether to generate an incident report. The reporting engine may determine that an incident report should or should not be generated based on a comparison between a number of similar complaints and the reporting threshold 122. Alternatively, or additionally, the reporting engine 120 may determine whether to escalate a complaint. As an example, based on a comparison between the number of similar complaints and the reporting threshold, the reporting engine may transmit a request to the reporting parties to confer whether to come forward publicly.

The reporting engine 120 may determine whether to include a subset of complaint data in an incident report. The reporting engine 120 may, based on one or more thresholds, omit a subset of complaint data from an incident report. As an example, if the system identifies between 0 and 2 similar reports, the system does not generate an incident report. If the system identifies between 3 and 9 similar reports, the system generates an incident report which includes the name of an associated department but not the name of an accused professor. If the system identifies 10 or more similar reports, then the system generates an incident report revealing both the name of the accused professor and the name of the associated department.

In an embodiment, the reporting engine 120 includes hardware and/or software components for generating and submitting an incident report. Generating an incident report may comprise combining data from one or more complaints. The reporting engine 120 may transmit the incident report 132 to the IMS 130 to submit the incident report.

In an embodiment, the IMS 130 includes hardware and/or software configured to address a reported incident. The IMS 130 may identify issues based on a received incident report 132. The IMS may analyze the incident report 132 to determine an appropriate corrective action. The IMS may initiate actions to correct an issue. As an example, the IMS may receive an incident report describing a broken toilet. The IMS may generate a work order to repair the toilet. The IMS may transmit the work order to the appropriate agency.

The IMS 130 may be an external system specific to a particular organization or department. As an example, the CMS may be linked to IMSs of several organizations including Hawaii University, Software Co., and Best Bank.

The CMS may transmit incident reports to the appropriate IMS based on complaint parameters or incident report metadata. Alternatively, the IMS may be implemented as part of the CMS 100.

3. Selective Submission of an Incident Report

A. Contacting Reporting Entities

Figure 2A:
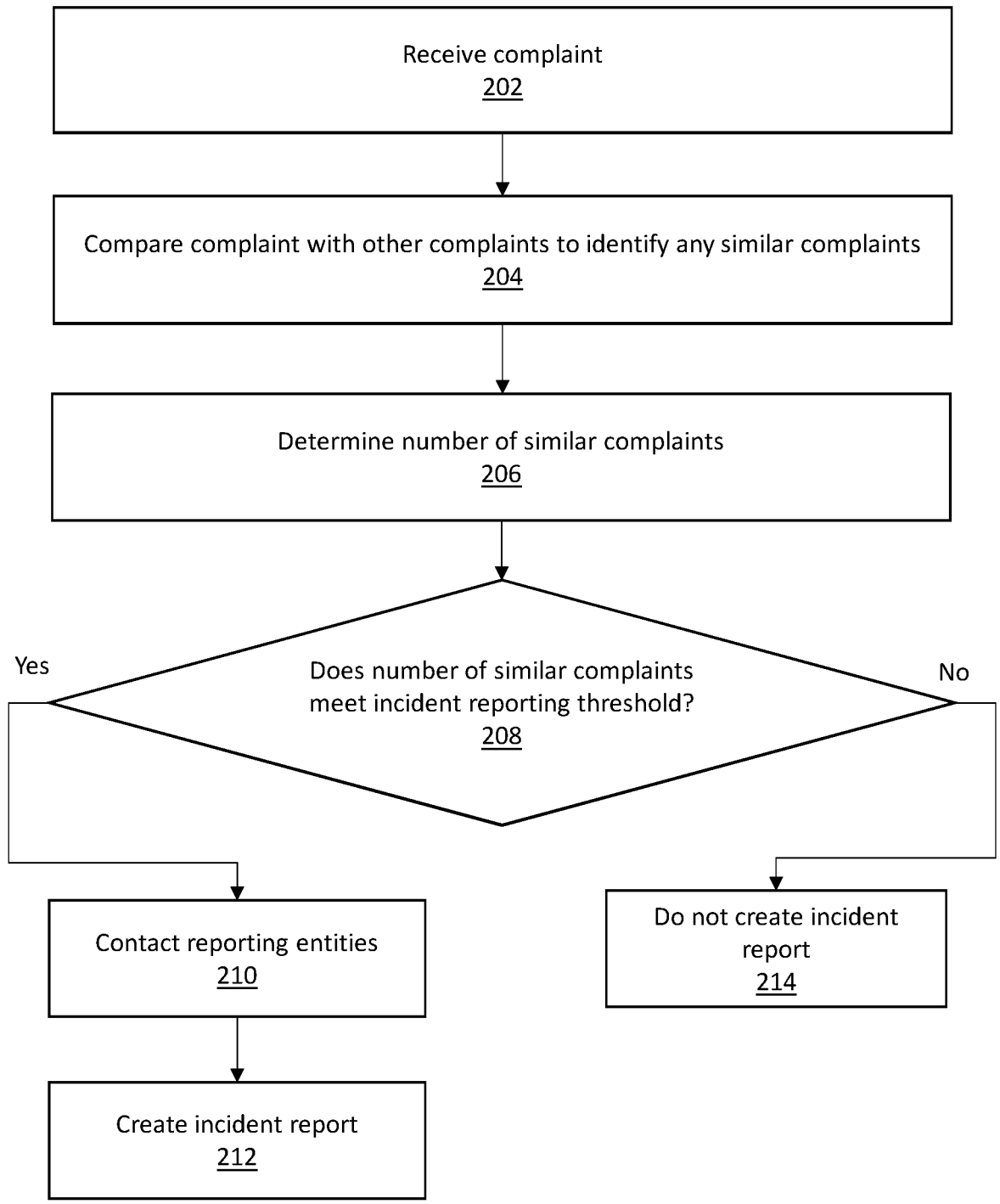
FIG. 2A illustrates an example set of operations for selectively submitting an incident report in accordance with one or more embodiments.

FIG. 2A illustrates an example set of operations for selectively submitting an incident report in accordance with one or more embodiments. One or more operations illustrated in FIG. 2A may be modified, rearranged, or omitted altogether. Accordingly, the particular sequence of operations illustrated in FIG. 2A should not be construed as limiting the scope of one or more embodiments.

In one or more embodiments, the CMS receives a complaint (Operation 202). The CMS may receive a complaint responsive to user submission of the complaint via the complaint interface. As an example, the CMS may receive a complaint, explaining an incident, received via user input to a set of text boxes displayed via the complaint interface. As another example, the CMS may receive a complaint via a complaint form that a user uploaded via the complaint interface.

In an embodiment, the CMS may generate a record to store selected words or phrases identified in the complaint. The CMS may identify text to store in association with a particular complaint parameter. As an example, the CMS identifies the text, Alice Bradley, which has been entered in association with a field for receiving the name of the user submitting the complaint. Accordingly, the CMS stores the string Alice Bradley to a column of a data table corresponding to the column Reporting Entity.

In an embodiment, the CMS may identify synonyms and/or complaint parameters based on text identified in the complaint. As an example, the CMS identifies the phrase, "asked for two hundred dollars to give me an A." The CMS determines that the phrase corresponds to the complaint parameter Alteration_of_Grades. Accordingly, the CMS stores the complaint parameter Alteration_of_Grades to the record.

In an embodiment, the CMS may encrypt some or all of the complaint parameters prior to storing the complaint parameters to the record. The CMS may use a hash, or other function, to generate a key that is unique for a given complaint parameter. The CMS may generate hash values, based on one or more complaint parameters, to enable future comparison of the complaint parameters across complaints. As an example, the CMS stores a record, corresponding to an incident report, with a date, an encrypted tuple of {reporter, accused, act, location}, and hashes of the accused and act.

In an embodiment, the complaint comparison engine compares the complaint with other complaints (Operation 204). The complaint comparison engine may compare the complaint to one or more previously received complaints to identify any similar complaints. The complaint comparison engine may compare a set of complaints by searching for matching keywords across the complaints. The complaint comparison engine may compare a set of complaints via string similarity comparison. The complaint comparison engine may compare a set of complaints by searching for matching hash values across the complaints.

In an embodiment, the complaint comparison engine may compare stored complaint parameters based on a position in a table. As an example, the CMS stores a table of records. Each row in the table is a record corresponding to a complaint. The first column stores an encrypted tuple of {date, reporter, accused, act, location}. The second column stores a hash value corresponding to the reporter name. The third column stores a hash value corresponding to the accused entity. The fourth column stores a hash value corresponding to the act described in the complaint. The complaint comparison engine identifies the records wherein columns three and four are identical.

In an embodiment, the complaint comparison engine compares complaints using a similarity metric. The similarity metric may describe a set of complaint parameters to compare for a particular set of complaints. If a threshold number of complaint parameters match, then the complaints are similar. As an example, the similarity threshold is that two complaints must include the same accused entity and the same complaint type. Upon determining that two complaints include the same accused entity and the same complaint type, the CMS determines that the two complaints are similar.

In an embodiment, the complaint comparison engine uses a similarity metric to compute a similarity score based on a set of complaints. The complaint comparison engine may determine that a set of complaints are similar if the similarity score meets a threshold value. As an example, the CMS computes a similarity score for two complaints related to corporate behavior using the following algorithm:

$$S=\frac{1}{3}(\delta(d)+\delta(t)+\delta(c))$$

where $\delta(d)=1$ if two complaints relate to the same division (e.g. marketing or engineering), otherwise, $\delta(d)=0$. $\delta(a)=1$ if two complaints relate to the same accused entity, otherwise, $\delta(a)=0$. $\delta(y)=1$ if two complaints relate to incidents occurring in a same calendar year, otherwise=0. S, the similarity score, may be a value between 0 and 1. The complaint comparison engine determines that two complaints are similar if the similarity score exceeds a threshold value of 0.6.

In an embodiment, the CMS determines a number of similar complaints (Operation 206). The CMS may compare a newly received complaint to a set of previously received complaints to determine whether each previously received complaint is similar to the newly received complaint. Each time the CMS identifies a previously received complaint which is similar to the newly received complaint, the CMS may increment a counter. Alternatively, or additionally, the CMS may identify a number of similar complaints by identifying a number of rows in a table which include one or more same or similar complaint parameter entries.

In an embodiment, the reporting engine determines whether the number of similar complaints meets the incident reporting threshold (Operation 208). A number of complaints meets a threshold if the number of complaints is greater than or equal to threshold. The reporting engine may compare the determined number of similar complaints to a stored incident reporting threshold. As an example, the CMS has identified ten similar complaints. The incident reporting threshold is ten complaints. The CMS compares the number of similar complaints to the incident reporting threshold. The CMS determines that the number of similar complaints is equal to the incident reporting threshold. Accordingly, the CMS determines that the number of similar complaints meets the incident reporting threshold.

In an embodiment, the CMS contacts the reporting entities (Operation 210). The CMS may contact the reporting entities by transmitting a message to the reporting entities. The message may request permission, from the reporting entities, to submit an incident report. Alternatively, or additionally, the message may prompt each reporting entity to respond whether the reporting entity wishes to reveal the identity of the reporting entity. The CMS may reveal the identities of one or more reporting entities based on the received responses. Alternatively, or additionally, the CMS may contact the reporting entities to request additional information. As an example, the CMS may contact a reporting entity to request the date of an incident.

In an embodiment, the CMS may securely contact the reporting entities by transmitting an encrypted message to a group of client devices. Some or all of the client devices may be associated with reporting entities. A client device associated with a reporting entity may use a one-time key to create an encrypted message, such as a ciphertext. The client device may generate the ciphertext and transmit the ciphertext to the CMS with the complaint. The one-time key should be unique for each complaint. The client has access to the one-time key, while the CMS does not.

To contact a particular reporting entity securely, the CMS may transmit the ciphertext to every client device. The single client device which recognizes the ciphertext, based on the corresponding key, can decrypt the message. The client device may present the message to the user associated with the client device. The message, may, for example, request the identity of the reporter. If the user accepts, then the client device transmits the identity of the reporter to the CMS via a secure channel. If the client device does not recognize the ciphertext, then the client device may transmit, via a secure channel, a message to the CMS with a sentinel identity. Similarly, if the user declines to reveal the reporter identity, then the client device may transmit a message to the CMS with a sentinel identity, hidden in secure channel, specifying that the user declined to reveal the reporter identity. Because the CMS transmits the request to every client, traffic analysis patterns do not disclose which client the CMS has been communicating with.

In an embodiment, the CMS creates an incident report (Operation 212). The CMS may create an incident report by combining data from multiple complaints. The CMS may obtain, from the database, complaint parameters and/or hash values corresponding to a set of similar complaints.

The CMS may create an incident report by selectively including information from a set of similar complaints. As an example, the CMS creates an incident report related to multiple accusations of a manager encouraging employees to engage in fraudulent activity. The CMS includes, in the incident report, the common accused entity and action. The CMS further includes, in the incident report, data from each individual complaint such as the reporter and the date and time of the incident. Alternatively, the CMS may create an incident report by including a set of similar complaints, in whole or in part. As an example, the CMS creates an incident report by combining a set of individual complaints related to a particular student harassing other students.

In an embodiment, the CMS may decrypt some, or all, of the complaint parameters for inclusion in the incident report. The CMS may decrypt an encrypted tuple in whole or in part to reveal complaint parameters. As an example, the complaint parameters may be stored as an encrypted tuple {encrypt(KeyR, Reporter), Location, Incident Type}. The system may decrypt Location and Incident Type. The system may refrain from decrypting Reporter unless the reporter gives permission by permitting transmission of the associated key.

In an embodiment, the CMS may refrain from creating an incident report (Operation 214). The CMS may refrain from creating an incident report until a threshold number of reporting entities have come forward with similar complaints.

B. Progressive Disclosure

Figure 2B:
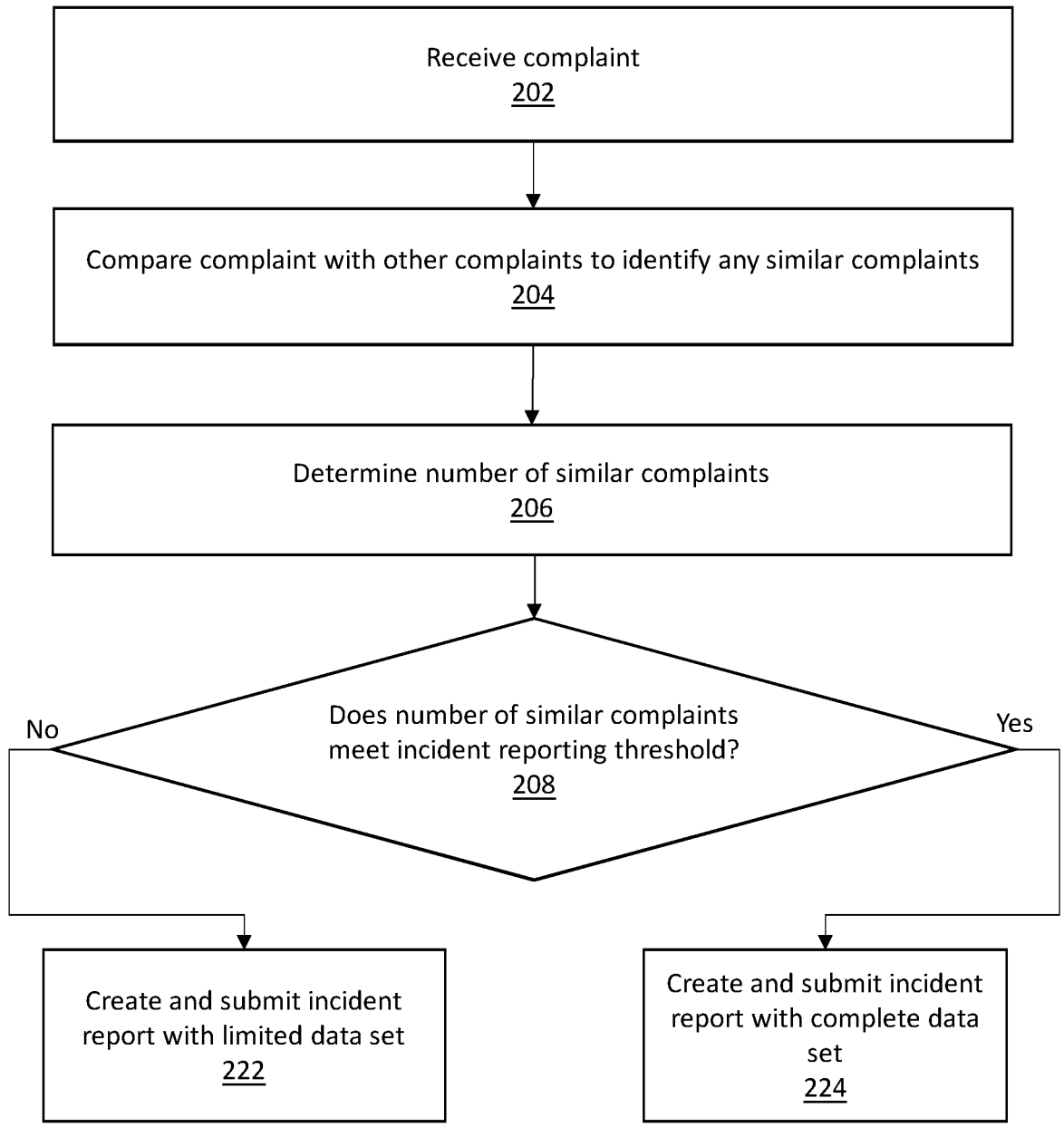
FIG. 2B illustrates an example set of operations for selectively including information in an incident report in accordance with one or more embodiments.

FIG. 2B illustrates an example set of operations for selectively including information in an incident report in accordance with one or more embodiments. One or more operations illustrated in FIG. 2B may be modified, rearranged, or omitted altogether. Accordingly, the particular sequence of operations illustrated in FIG. 2B should not be construed as limiting the scope of one or more embodiments.

Operations 202-208 are as described above with respect to FIG. 2A. The system receives a complaint, determines a number of similar complaints, and determines whether the number of similar complaints meets the incident reporting threshold.

In an embodiment, if the number of similar complaints does not meet the incident reporting threshold, then the CMS creates and submits an incident report with a limited data set (Operation 222). The CMS may create an incident report with a limited data set by selectively excluding information from the incident report. As an example, if the number of similar complaints is below the incident reporting threshold, the CMS may report a detailed description of the incident without revealing the identities of the reporting entities. As another example, the CMS may create an incident report which describes the incident and names the reporting entities, but, instead of revealing an accused entity, reveals a department associated with the incident. The CMS may submit the incident report with the limited data set by transmitting the incident report to the IMS.

In an embodiment, the CMS creates and submits an incident report with a complete data set (Operation 224). The CMS may submit an incident report with a complete data set if the number of similar complaints meets the incident reporting threshold. The CMS may generate an incident report with a complete data set by including some or all of the information in the similar complaints. As an example, the CMS may create a complete data set which includes the name of the accused party, a description of the incident, a location, and the name of the reporting entities.

In an embodiment, the CMS may select recipients for the incident report, based on the number of similar complaints. As an example, if the number of similar complaints greatly exceeds the reporting threshold, the CMS may transmit the incident report directly to a manager, in addition to submitting the incident report to the IMS.

In an embodiment, the CMS may select a mechanism for submission of the incident report, based on the number of similar complaints. As an example, if the number of similar complaints is equal to the reporting threshold, then the CMS submits the incident report via email. If the number of similar complaints is twice the reporting threshold, then the CMS submits the incident report via text message.

The following detailed example illustrates operations in accordance with one or more embodiments. The following detailed example should not be construed as limiting the scope of any of the claims. The system receives a new complaint, submitted by a student at California University named Joe Smith, via the complaint interface. The new complaint describes an incident in which a professor, Larry Jones, offered to alter grades for Joe Smith in exchange for money.

The CMS stores a record for the complaint with the date of the incident, an encrypted tuple of {reporter, accused, act}, and hashes corresponding to the accused entity, the act, and the reporting entity. The tuples are encrypted with a system key before committing the records. The tuples cannot be read by anyone without access to the key. The hashes cannot be traced back to the original value. The hashes provide a unique identifier for the corresponding values, without revealing the values. The hashes are used for comparison across records without revealing the original values.

The system stores the following record for the complaint: 1/3/10, {Joe Smith, Larry Jones, Alteration_of_Grades}, hashes [reporter=hash(Joe Smith), accused=hash(Larry Jones) act=hash(Alteration_of_Grades)].

Next, the system compares the new complaint to records, corresponding to previously received complaints, stored to the database. The system sorts and compares the hash values to identify similar complaints. The CMS uses the following similarity threshold: if complaints contain the same accused entity and the same act, and the incidents occurred within the same one-week period, then the complaints are similar. The CMS identifies four previously received complaints related to both Larry Jones and cheating and/or selling grades, which occurred within the same one-week period.

The system analyzes the hash values corresponding to the reporting entity. The system compares the hash values associated with the reporting entity to assure that the complaints are unique. If a previously received complaint includes the same reporting entity as the new complaint, the system may delete one of the duplicate reports. In this case, the system determines that each of the four previously received complaints are associated with different reporting entities than the new complaint. Accordingly, the CMS identifies a set of five similar complaints comprising the four previously received complaints and the new complaint.

Next, the system identifies an incident reporting threshold for cases related to professor dishonesty at California University. The incident reporting threshold is five. The policy at California University is as follows: if there are five or more similar complaints, then send a complete incident report, including the name of the accused party, to the University's IMS. If there are three or four similar complaints, then send an incident report, with a limited data set excluding the name of the accused party, to the university's IMS.

The CMS determines that the number of similar complaints exceeds the incident reporting threshold. Accordingly, the CMS creates an incident report with a complete data set. The incident report includes the following information:

Five students complain that Larry Jones has offered to adjust grades for a price.
Incident 1: reporter: Joe Smith; date: Nov. 18, 2016
Incident 2: reporter: Jenny McArthur; date: Nov. 10, 2016
Incident 3: reporter: Mary Gomez; date: Nov. 1, 2016
Incident 4: reporter: Lee Wu; date Oct. 31, 2016
Incident 5: reporter: Tommy Brown; date Oct. 15, 2016

The CMS submits the incident report to the University's IMS.

4. Reporting by Quorum

Detailed examples are described below for purposes of clarity. Components and/or operations described below should be understood as specific examples which may not be applicable to certain embodiments. Accordingly, components and/or operations described below should not be construed as limiting the scope of any of the claims.

In an embodiment, the CMS receives a set of complaints. For each complaint, the CMS stores a record. The record includes the date and an encrypted tuple of {encrypt(key, reporter), accused, act}. The tuple is encrypted with a nonce key. The CMS generates the nonce key, transmits the key to a client device associated with the reporting entity, and discards the key. Therefore, the client, but not the server, can unlock records. The CMS further generates hashes of elements needed for comparison. The hashes are taken prior to encrypting with the nonce key.

The CMS stores two records corresponding to two complaints. The complaints describe an incident in which a manager, Otto, directed bank employees to create fraudulent accounts. The records are:

8/6/17, {encrypt (KeyA, Al Francesco), Otto Johnson, Fraudulent Account}, hashes [accused=hash(Otto Johnson), act=hash(Fraudulent Account)]

8/9/17, {encrypt(Key, Brenda Stark), Otto Johnson, Fraudulent Account}, hashes [accused=hash(Otto Johnson), act=hash(Fraudulent Account)]

The CMS uses the hashes for comparison across records without revealing the original values. The CMS analyzes the records to compare the hashes of the accused and the act across the complaints. The system identifies a set of complaints, having the same hash values corresponding to the accused and the act, respectively. The system identifies a subset of the complaints which occurred within the same one-week time period. For the identified subset of the complaints, the system decrypts the accused and the act. At this point, all of the complaint parameters, except for the reporter identities, are revealed.

The CMS starts a voting process. The server is unable to decode the records. The server communicates with the clients to request an unlock key for the associated record. For each of the records that matched, the CMS transmits a request to every client to send the unlock key for the record. The request is via a broadcast over a secure channel. The broadcast is the encrypt(KeyA, Al Francesco) ciphertext. Only a single client can recognize the ciphertext for a row. This client will present the user with the option of voting to unveil the incident. If the user agrees, then the client application will send the unlock code (key) to the CMS via the secure channel. If the client does not recognize the reporter, or the user decides to vote no, the client sends a null key. The null key may specify that the user declined. The null key remains hidden in a secure channel. If the CMS receives a quorum of votes is, then the CMS unlocks the records.

Alternatively, the CMS may use erasure codes. Here, the server sends the client half of the key and keeps the other half with the record. Neither the client nor the server can unlock the record should the corresponding portion of the key be compromised. The CMS may transmit messages, to all potential reporters, which can only be read by the appropriate users.

5. Aggregation by Organization or Location

Detailed examples are described below for purposes of clarity. Components and/or operations described below should be understood as specific examples which may not be applicable to certain embodiments. Accordingly, components and/or operations described below should not be construed as limiting the scope of any of the claims.

In an embodiment, the CMS aggregates complaints based on complaint parameters. The CMS may aggregate complaints, based on complaint parameters such as organization or location, which do not otherwise meet the reporting threshold. As an example, the system may identify a set of similar complaints based on the complaints including a same accused entity. The number of similar complaints may be less than the reporting threshold. However, the accused persons are all in the same organization, indicating that a problem exists. To account for this situation, the CMS may aggregate the complaints based on the organizational unit.

The CMS may supplement hashes corresponding to the accused entity with additional information identifying the organizational unit. Even if there are not enough reports to decrypt the identities of the accused entities, the system may reveal the associated organizational unit. Actions to be taken may include decryption of subject identities or warnings to the appropriate managers that there may be a pattern of fraud that extends beyond a single individual. Related information such as location can be used to determine whether there is need for further action.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
  receiving, from a client device associated with a first reporting entity, a first complaint, the first complaint including at least a first reporting entity name and an accused entity name;
  generating, by the one or more hardware processors, a first set of one or more hash values for the first complaint based at least on the accused entity name;
  generating, by the one or more hardware processors, a second set of one or more hash values, for the first complaint, based at least on the first reporting entity name;
  storing, in memory in communication with the one or more hardware processors, the first complaint with the first set of hash values and the second set of hash values instead of the first reporting entity name and the accused entity name, wherein the first set of one or more hash values preserves confidentiality of the accused entity name while enabling searchability of the first complaint based on the accused entity name;
  determining, by the one or more hardware processors, a similarity metric for each of a plurality of previously received complaints in relation to the first complaint at least by comparing (a) the first set of one or more hash values with (b) each hash value corresponding respectively to the plurality of previously received complaints;
  identifying, by the one or more hardware processors, a number of a first subset of previously received complaints, from the plurality of previously received complaints such that the similarity metric of each previously received complaint in the first subset of previously received complaints meets a similarity threshold;
  determining, by the one or more hardware processors, whether the number of the first subset of the previously received complaints, with the similarity metric that meets the similarity threshold, meets a reporting threshold;
  performing, by the one or more hardware processors, one of:
    responsive to determining that the number of the first subset of previously received complaints, with the similarity metric that meets the similarity threshold, does not meet the reporting threshold: refraining from submitting the first reporting entity name to an incident management system; or
    responsive to determining that the number of the first subset of previously received complaints, with the similarity metric that meets the similarity threshold, meets the reporting threshold:
      submitting the first reporting entity name to the incident management system;
      identifying a set of previous reporting entities corresponding to the plurality of previously received complaints;

identifying a first set of reporting entities comprising the set of previous reporting entities and the first reporting entity;

transmitting a request for a vote to the first set of reporting entities;

determining whether a quorum of the first set of reporting entities has voted affirmatively; and if a quorum of the first set of reporting entities has voted affirmatively, determining that the reporting threshold has been met.

2. The medium of claim 1, wherein:

submitting the first reporting entity name to the incident management system comprises submitting an incident report with the first reporting entity name; and refraining from submitting the first reporting entity name to the incident management system comprises refraining from submitting any incident report corresponding to the first complaint.

3. The medium of claim 1, wherein determining, by the one or more hardware processors, the similarity metric for each of the plurality of previously received complaints in relation to the first complaint further comprises:

extracting, by the one or more hardware processors, keywords from the first complaint; and comparing, by the one or more hardware processors, the keywords from the first complaint to keywords from each of the plurality of previously received complaints.

4. The medium of claim 1, wherein determining, by the one or more hardware processors, the similarity metric for each of the plurality of previously received complaints in relation to the first complaint further comprises:

using string similarity comparisons to compare each of the plurality of previously received complaints to the first complaint.

5. The medium of claim 1, wherein the operations further comprise:

responsive to determining that the number of the first subset of previously received complaints with the similarity metric that meets the similarity threshold does not meet the reporting threshold, but does meet a second reporting threshold:

submitting, by the one or more hardware processors, a portion of the first complaint to the incident management system without submitting the first reporting entity name to the incident management system.

6. The medium of claim 1, wherein the operations further comprise:

selecting, by the one or more hardware processors, recipients for submission of at least a portion of the first complaint, based on the number of the first subset of previously received complaints with the similarity metric that meets the similarity threshold.

7. The medium of claim 1, wherein the operations further comprise:

selecting, by the one or more hardware processors, a mechanism for submission of at least a portion of the first complaint, based on the number of the first subset of previously received complaints with the similarity metric that meets the similarity threshold.

8. The medium of claim 1, wherein transmitting the request comprises:

assigning, by the one or more hardware processors, a key to each reporting entity, of the first set of reporting entities; and transmitting, by the one or more hardware processors, an encrypted message comprising the request to a plurality of reporting entities including the first set of reporting entities and additional reporting entities; and wherein the message is displayed to the first set of reporting entities based on a presence of the key.

9. The medium of claim 1, wherein the operations further comprise:

assigning a key to the first reporting entity; and transmitting, by the one or more hardware processors, an encrypted message to a plurality of reporting entities including the first reporting entity; and wherein the message is displayed to the first reporting entity based on a presence of the key.

10. The medium of claim 1, wherein the operations further comprise encrypting, by the one or more hardware processors, an identity of the first reporting entity.

11. A method comprising:

receiving, from a client device associated with a first reporting entity, a first complaint, the first complaint including at least a first reporting entity name and an accused entity name;

generating, by a hardware processor, a first set of one or more hash values for the first complaint based at least on the accused entity name;

generating, by the hardware processor, a second set of one or more hash values, for the first complaint, based at least on the first reporting entity name;

storing, by the hardware processor, the first complaint with the first set of hash values and the second set of hash values instead of the first reporting entity name and the accused entity name, wherein the first set of one or more hash values preserves confidentiality of the accused entity name while enabling searchability of the first complaint based on the accused entity name;

determining, by the hardware processor, a similarity metric for each of a plurality of previously received complaints in relation to the first complaint at least by comparing (a) the first set of one or more hash values with (b) each hash value corresponding respectively to the plurality of previously received complaints;

identifying, by the hardware processor, a number of a first subset of previously received complaints, from the plurality of previously received complaints such that the similarity metric of each previously received complaint in the first subset of previously received complaints meets a similarity threshold;

determining, by the hardware processor, whether the number of the first subset of the previously received complaints, with the similarity metric that meets the similarity threshold, meets a reporting threshold;

performing, by the hardware processor, one of:

responsive to determining that the number of the first subset of previously received complaints, with the similarity metric that meets the similarity threshold, does not meet the reporting threshold: refraining from submitting the first reporting entity name to an incident management system; or responsive to determining that the number of the first subset of previously received complaints, with the similarity metric that meets the similarity threshold, meets the reporting threshold:

submitting the first reporting entity name to the incident management system;

identifying a set of previous reporting entities corresponding to the plurality of previously received complaints;

identifying a first set of reporting entities comprising the set of previous reporting entities and the first reporting entity;

transmitting a request for a vote to the first set of reporting entities;

determining whether a quorum of the first set of reporting entities has voted affirmatively; and if a quorum of the first set of reporting entities has voted affirmatively, determining that the reporting threshold has been met.

12. The method of claim 11, wherein:

submitting the first reporting entity name to the incident management system comprises submitting an incident report with the first reporting entity name; and refraining from submitting the first reporting entity name to the incident management system comprises refraining from submitting any incident report corresponding to the first complaint.

13. The method of claim 11, wherein determining, by the hardware processor, the similarity metric for each of the plurality of previously received complaints in relation to the first complaint further comprises:

extracting, by the hardware processor, keywords from the first complaint; and comparing, by the hardware processor, the keywords from the first complaint to keywords from each of the plurality of previously received complaints.

14. The method of claim 11, wherein determining, by the hardware processor, the similarity metric for each of the plurality of previously received complaints in relation to the first complaint further comprises:

using string similarity comparisons to compare each of the plurality of previously received complaints to the first complaint.

15. The method of claim 11, wherein the operations further comprise:

responsive to determining, by the hardware processor, that the number of the first subset of previously received complaints with the similarity metric that meets the similarity threshold does not meet the reporting threshold, but does meet a second reporting threshold:

submitting, by the hardware processor, a portion of the first complaint to the incident management system without submitting the first reporting entity name to the incident management system.

16. The method of claim 11, wherein the operations further comprise:

selecting, by the hardware processor, recipients for submission of at least a portion of the first complaint, based on the number of the first subset of previously received complaints with the similarity metric that meets the similarity threshold.

17. The method of claim 11, wherein the operations further comprise:

selecting, by the hardware processor, a mechanism for submission of at least a portion of the first complaint, based on the number of the first subset of previously received complaints with the similarity metric that meets the similarity threshold.

18. The method of claim 11, wherein the operations further comprise:

assigning, by the hardware processor, key to the first reporting entity; and transmitting, by the hardware processor, an encrypted message to a plurality of reporting entities including the first reporting entity; and wherein the message is displayed to the first reporting entity based on a presence of the key.

19. The method of claim 11, wherein the operations further comprise encrypting, by the hardware processor, an identity of the first reporting entity.

20. A system comprising:

at least one device including a hardware processor;

the at least one device configured to execute instructions stored on a non-transitory computer readable medium to perform operations comprising:

receiving, from a client device associated with a first reporting entity, a first complaint, the first complaint including at least a first reporting entity name and an accused entity name;

generating, by the hardware processor of the at least one device, a first set of one or more hash values for the first complaint based at least on the accused entity name;

generating, by the hardware processor of the at least one device, a second set of one or more hash values, for the first complaint, based at least on the first reporting entity name;

storing, by the hardware processor in memory in communication with the hardware processor, the first complaint with the first set of hash values and the second set of hash values instead of the first reporting entity name and the accused entity name, wherein the first set of one or more hash values preserves confidentiality of the accused entity name while enabling searchability of the first complaint based on the accused entity name;

determining, by the hardware processor of the at least one device, a similarity metric for each of a plurality of previously received complaints in relation to the first complaint at least by comparing (a) the first set of one or more hash values with (b) each hash value corresponding respectively to the plurality of previously received complaints;

identifying, by the hardware processor of the at least one device, a number of a first subset of previously received complaints, from the plurality of previously received complaints such that the similarity metric of each previously received complaint in the first subset of previously received complaints meets a similarity threshold;

determining, by the hardware processor of the at least one device, whether the number of the first subset of the previously received complaints, with the similarity metric that meets the similarity threshold, meets a reporting threshold;

performing, by the hardware processor of the at least one device, one of:

responsive to determining that the number of the first subset of previously received complaints, with the similarity metric that meets the similarity threshold, does not meet the reporting threshold: refraining from submitting the first reporting entity name to an incident management system; or responsive to determining that the number of the first subset of previously received complaints, with the similarity metric that meets the similarity threshold, meets the reporting threshold:

submitting the first reporting entity name to the incident management system;

identifying a set of previous reporting entities corresponding to the plurality of previously received complaints;

identifying a first set of reporting entities comprising the set of previous reporting entities and the first reporting entity;

transmitting a request for a vote to the first set of reporting entities;

determining whether a quorum of the first set of reporting entities has voted affirmatively; and if a quorum of the first set of reporting entities has voted affirmatively, determining that the reporting threshold has been met.

21. The system of claim 20, wherein:

submitting the first reporting entity name to the incident management system comprises submitting an incident report with the first reporting entity name; and refraining from submitting the first reporting entity name to the incident management system comprises refraining from submitting any incident report corresponding to the first complaint.

22. The system of claim 20, wherein determining, by the hardware processor of the at least one device, the similarity metric for each of the plurality of previously received complaints in relation to the first complaint further comprises:

extracting, by the hardware processor of the at least one device, keywords from the first complaint; and comparing, by the hardware processor of the at least one device, the keywords from the first complaint to keywords from each of the plurality of previously received complaints.

23. The system of claim 20, wherein determining, by the hardware processor of the at least one device, the similarity metric for each of the plurality of previously received complaints in relation to the first complaint further comprises:

using string similarity comparisons to compare each of the plurality of previously received complaints to the first complaint.

24. The system of claim 20, wherein the operations further comprise:

responsive to determining, by the hardware processor of the at least one device, that the number of the first subset of previously received complaints with the similarity metric that meets the similarity threshold does not meet the reporting threshold, but does meet a second reporting threshold:

submitting, by the hardware processor of the at least one device, a portion of the first complaint to the incident management system without submitting the first reporting entity name to the incident management system.

25. The system of claim 20, wherein the operations further comprise:

selecting, by the hardware processor of the at least one device, recipients for submission of at least a portion of the first complaint, based on the number of the first subset of previously received complaints with the similarity metric that meets the similarity threshold.

26. The system of claim 20, wherein the operations further comprise:

selecting, by the hardware processor of the at least one device, a mechanism for submission of at least a portion of the first complaint, based on the number of the first subset of previously received complaints with the similarity metric that meets the similarity threshold.

27. The system of claim 20, wherein the operations further comprise:

assigning, by the hardware processor of the at least one device, a key to the first reporting entity; and transmitting, by the hardware processor of the at least one device, an encrypted message to a plurality of reporting entities including the first reporting entity; and wherein the message is displayed to the first reporting entity based on a presence of the key.

28. The system of claim 20, wherein the operations further comprise encrypting, by the hardware processor of the at least one device, an identity of the first reporting entity.

* * * * *